Mar. 5, 1929.  C. D. McARTHUR  1,703,941
CHAIN MORTISING MACHINE
Filed May 29, 1928   2 Sheets-Sheet 1

INVENTOR
Charles D. McArthur

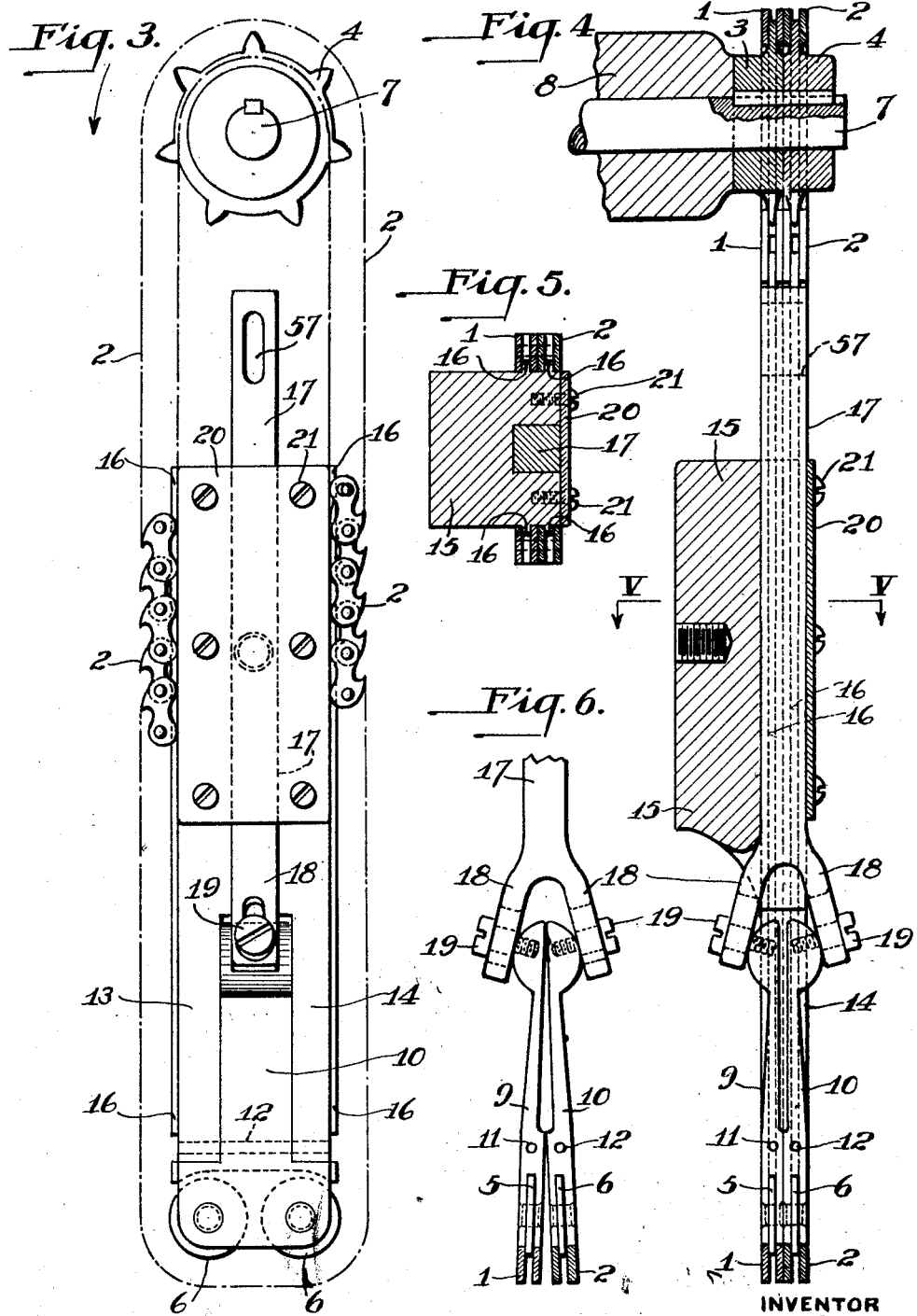

Patented Mar. 5, 1929.

1,703,941

UNITED STATES PATENT OFFICE.

CHARLES D. McARTHUR, OF DAYTON, OHIO.

CHAIN MORTISING MACHINE.

Application filed May 29, 1928. Serial No. 281,503.

Figure 1:
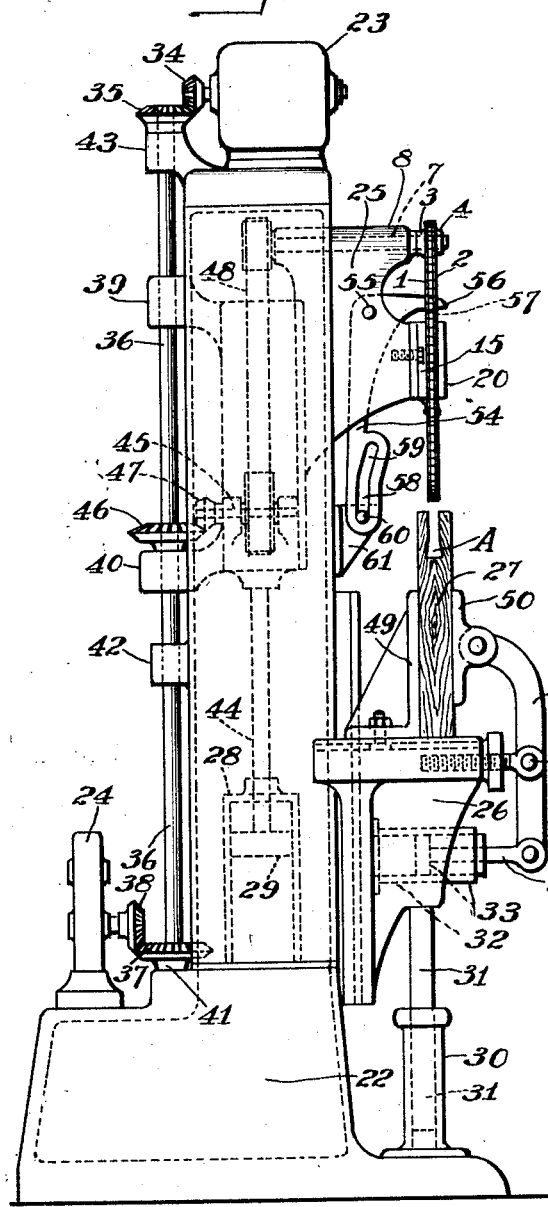
Figure 2:
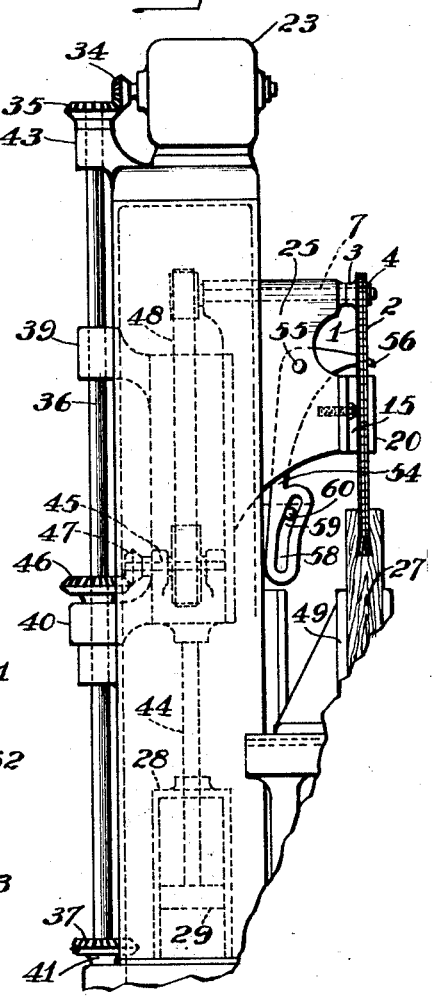

The invention relates to mortising machines of the chain saw type. It has for its principal objects, the provision of a machine which can be employed to produce an undercut mortise; the provision of a machine which will operate automatically to produce a mortise having the outer portion straight and the inner portion undercut, and the provision of a machine of simple construction easily operated, which will cut mortises of the type specified rapidly and accurately. One embodiment of the invention is illustrated in the accompanying drawings, wherein:

Figure 1 is a side elevation of the complete machine with the parts in the position occupied after a mortise has been cut and preliminary to the cutting of another. Fig. 2 is a partial view of the machine showing the position of the parts at the completion of the cut. Fig. 3 is a side elevation of the cutting element. Fig. 4 is a longitudinal section through the cutting element with the undercutting levers in closed position. Fig. 5 is a section on the line V—V of Fig. 4. And Fig. 6 is a view similar to that shown in the lower part of Fig. 4, but with the undercutting levers in expanded position.

The cutting element, which is designed to cut a mortise with a widened portion at its lower end, as indicated at A in Fig. 1, is shown in detail in Figs. 3 to 6. A pair of narrow cutting chains 1 and 2 are employed passing around the sprockets 3 and 4 at the upper end of the element and around the pairs of wheels 5, 5 and 6, 6 at their lower ends. The sprockets are keyed to the shaft 7 journalled in the bearing 8, and driven as later described. The wheels 5, 5 and 6, 6 are mounted for rotation in the levers 9 and 10. The levers are pivoted upon pins 11 and 12 carried in the lower ends of the arms 13 and 14 integral with the guide block 15, such block being bolted to the frame of the machine in fixed relation with respect to the bearing 8. The block 15 is provided on its sides with the guide ribs 16, 16 (Fig. 5), which fit between the pairs of side links of the chains 1 and 2. The block 15 is also provided with a slot in which fits the shank 17 of the cam member whose vertical movement is employed to open and close the levers 9 and 10. The shank has at its lower end the inclined arms 18, 18 slotted to receive the screws 19, 19, which are screwed tightly into the upper ends of the levers 9 and 10. The shank is held in its slot in the block 15 by means of the face plate 20 secured to the block by the screws 21. When the cam member is in its uppermost position, as indicated in Fig. 4, the upper ends of the arms 9 and 10 are separated, their lower ends being brought together, and the tool will cut a slot with straight sides. When the cam member is moved down to the position of Fig. 6, the inclined ends 18, 18 of the cam member force the upper ends of the levers toward each other, thus separating the lower ends of the levers and the cutting chains, so that an undercut is produced in the mortise. In operation, the upper part of the mortise is cut with the levers in the position of Fig. 4, and automatic means then function to move the shank 17 gradually downward as the cutting element moves downwardly, so that the chains 1 and 2 are gradually separated, thus producing the undercut lower portion of the mortise A.

The apparatus preferably used for operating the mortising elements is shown in Figs. 1 and 2, wherein 22 is the framework of the machine; 23 is the driving motor; 24 is the centrifugal pump; 25 is the tool head guided for vertical movement in the frame and carrying the mortising element; 26 is the work platen carrying the member 27 which has just been mortised; 28 is a cylinder carrying the plunger 29 which moves the head 25 up and down; 30 is a cylinder provided with a plunger 31 for raising and lowering the work platen; and 32 is still another cylinder provided with a plunger 33 for clamping the work on the work platen.

The pump 24 provides the pressure for operating the plungers 29, 31 and 33, suitable piping connections with the usual three-way valves (not shown) being provided for connecting the ends of the cylinders carrying the plungers with the liquid supplied under pressure by the pump. The pump is driven from the motor 23 by the bevel gears 34, 35, the shaft 36, and the bevel gears 37, 38. The tool head 25 is suitably guided in the frame 22 for vertical movement and is provided with a pair of collars 39 and 40 slidably engaging the shaft 36, such shaft being journalled in the collars 41, 42 and 43 rigid with the frame 22. The head is moved up and down by the piston rod 44 connected at its lower end to the plunger 29, and has journalled in its upper and lower ends respectively the transverse shafts 7 and 45, the shaft 45 being driven from the vertical shaft 36 by the gears 46 and 47, the first of which is splined on the shaft 36. The shaft 7 is driven from the shaft 45 by a belt 48 passing around pulleys on the two shafts.

The work platen 26 is mounted for vertical movement on the frame 22, and is moved up and down by the plunger 31 operated by fluid pressure from the pump 24. The platen carries a fixed abutment 49 for engaging one side of the work 27, the other side of such work being engaged by a clamping plate 50. The plate 50 is pivoted to the upper end of the lever 51, which is fulcrumed at 52 to the platen 26. The lower end of the lever is moved in and out by the piston rod 53 connected to the plunger 33.

The downward movement of the shank 17 (Figs. 4 and 6) to open the arms 9 and 10 is secured by the cam plate 54, pivoted in the tool head 25 at 55, and having a nose 56 which projects through the slot 57 (Fig. 3) in the shank. The lower end of the cam plate has a cam slot comprising the straight portion 58 and the inclined portion 59, such slot being engaged by a pin 60 carried by the bracket 61 attached to the machine frame and, therefore, fixed relative to the head.

In operation, the parts, preliminary to the mortising operation to cut the slot A, are in the position shown in Fig. 1, the motor 23 being started to secure the necessary pressure from the pump 24 and to rotate the shaft 7, which in turn drives the cutting chains 1, 2 at a relatively high rate of speed. The head 25 is now caused to move down by exhausting the fluid on the lower side of the plunger 29 and admitting pressure on the upper side thereof. This movement carries the cutting chains down against the edge of the work 27. During the first portion of the cutting travel of the head, the levers 9 and 10 occupy the position shown in Fig. 4, and a straight sided slot is cut, the pin 60, during this period, riding in the straight portion 58 (Fig. 1) of the slot in the cam plate, so that the plate is not moved around the pivot 55. When the inclined portion 59 of the slot is engaged by the pin, the lower end of the cam plate is swung to the left, as indicated in Fig. 2, thus moving the nose 56 of the plate downward, so that the shank 17 is moved down. This cams the upper ends of the levers 9 and 10 toward each other, and separates the lower ends. The saw chains are thus spread apart, cutting the undercut portion of the slot A. As the head 25 is moved upward to withdraw the tool from the work, a reverse movement of the parts is secured, the lower ends of the levers being moved back to the position of Fig. 4, as the tool moves up, so that the cutting tool clears the mortise during the withdrawing movement. The character of the mortise cut may be modified to suit requirements by substituting other plates having differently proportioned slots 58, 59.

What I claim is:

1. In combination in a chain mortising machine, a pair of endless cutting chains arranged side by side, a frame in which the chains are mounted, a pair of guide members around which the chains pass at one end of the frame mounted for movement toward and from each other in a direction transverse to the planes in which the chains lie, and means for driving the chains.

2. In combination in a chain mortising machine, a pair of endless cutting chains arranged side by side, a frame in which the chains are guided, driving sprockets around which the chains pass at one end of the frame, a pair of guide members around which the chains pass pivotally mounted at the other end of the frame so that such members may be separated or brought into parallelism, and means for driving the sprockets.

3. In combination in a chain mortising machine, a pair of endless cutting chains arranged side by side, a tool head mounted for reciprocating movement in which the chains are mounted, driving sprockets carried by the head around which the chains pass, a pair of guide members carried by the head around which the chains also pass mounted for movement toward and from each other so that the chains may be separated or brought into parallelism, and means actuated by the movement of the head when moved in one direction for causing the guide members to separate and for causing them to move toward each other when moved in the reverse direction.

4. In combination in a chain mortising machine, a pair of endless cutting chains arranged side by side, a tool head mounted for reciprocating movement in which the chains are mounted, driving sprockets carried by the head around which the chains pass, a pair of guide members carried by the head and each provided with a pair of rollers around which the chains pass, such members being pivotally supported for movement toward and from each other, and means actuated by the movement of the head in one direction for separating said members and for moving them toward each other when the head is moved in the reverse direction.

5. In combination in a chain mortising machine, a pair of endless cutting chains arranged side by side, a tool head mounted for reciprocating movement in which the chains are mounted, driving sprockets carried by the head around which the chains pass, a pair of guide members carried by the head and each provided with a pair of rollers around which the chains pass, such members being pivotally supported for movement toward and from each other, cam means carried by the head for opening and closing said members, and means fixed with respect to the head and cooperating with the cam means for causing said members to open and close as the head is moved up and down.

6. In combination in a chain mortising machine, a pair of endless cutting chains arranged side by side, a frame in which the chains are guided, driving sprockets around which the chains pass at one end of the frame, a pair of guide members around which the chains pass pivotally mounted at the other end of the frame so that such members may be separated or brought into parallelism, means mounted for movement longitudinally of the frame for separating said members and moving them into parallelism, and means for driving the sprockets.

7. In combination in a chain mortising machine, a pair of endless cutting chains arranged side by side, a frame in which the chains are mounted, a pair of guide members around which the chains pass at one end of the frame mounted for movement toward and from each other in a direction transverse to the planes in which the chains lie, means mounted for movement longitudinally of the frame for separating said members and moving them into parallelism, and means for driving the chains.

8. In combination in a chain mortising machine, a pair of endless cutting chains arranged side by side, a frame in which the chains are mounted, a pair of guide members around which the chains pass at one end of the frame mounted for movement toward and from each other in a direction transverse to the planes in which the chains lie, means mounted for movement longitudinally of the frame for separating said members and moving them into parallelism, means adapted to be operated by the movement of the frame for operating said last means, and means for driving the chains.

9. In combination in a chain mortising machine, a frame mounted for vertical movement, a pair of endless cutting chains guided side by side in the frame, a pair of separable guide members at the lower end of the frame provided with rollers around which the chains pass, means movable longitudinally of the frame for separating and closing said members, means operated by the downward movement of the frame for moving said last means to separate said members as the frame moves down, and means carried by the frame for driving the chains.

10. In combination in a chain mortising machine, a frame mounted for vertical movement, a pair of endless cutting chains side by side in the frame, a pair of separable guide members at the lower end of the frame provided with rollers around which the chains pass, means movable longitudinally of the frame for separating and closing said members, a cam member on the frame engaging said last means and operated by the downward movement of the frame so as to move said last means to separate said members, and means carried by the frame for driving the chains.

In testimony whereof, I have hereunto subscribed my name this 26th day of May, 1928.

CHAS. D. McARTHUR.